(12) United States Patent
Nishimura et al.

(10) Patent No.: US 7,353,352 B2
(45) Date of Patent: Apr. 1, 2008

(54) BACKUP TECHNIQUE FOR RECORDING DEVICES EMPLOYING DIFFERENT STORAGE FORMS

(75) Inventors: Tetsuroh Nishimura, Yokosuka (JP); Kyohsuke Mukuda, Yokohama (JP); Ayako Yamamoto, Kawasaki (JP); Kaori Takizawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/551,186

(22) Filed: Oct. 19, 2006

(65) Prior Publication Data

US 2007/0124553 A1 May 31, 2007

Related U.S. Application Data

(63) Continuation of application No. 10/449,577, filed on May 30, 2003, now Pat. No. 7,162,597.

(30) Foreign Application Priority Data

May 31, 2002 (JP) .............................. 2002-160103

(51) Int. Cl.
*G06F 12/00* (2006.01)
(52) U.S. Cl. ....................... 711/162; 711/161; 707/204; 714/6

(58) Field of Classification Search ..................... None
See application file for complete search history.

(56) References Cited

FOREIGN PATENT DOCUMENTS

| JP | 03-171241 | 7/1991 |
|---|---|---|
| JP | 2000-305719 | 11/2000 |
| JP | 2001-014201 | 1/2001 |
| JP | 2001-265628 | 9/2001 |
| JP | 2001-344139 | 12/2001 |
| JP | 2001-356945 | 12/2001 |

*Primary Examiner*—Jasmine Song
(74) *Attorney, Agent, or Firm*—Tomothy N. Ellis

(57) ABSTRACT

One aspect of the invention is a backup system that collectively performs the backup of data in a block form stored by a block recording device, and the back of data in a file form stored by a file recording device. According to the present invention, a backup system comprises: a first storage unit for storing first data using a first storage form; a second storage unit for storing second data using a second storage form; a backup storage unit for storing backup data for the first data and the second data; a storage form converter for converting into data for the second storage form the first data stored in the first storage form by the first storage unit; and a backup manager for copying into the backup storage unit the first data and the second data stored in the second storage form by the second storage unit.

20 Claims, 5 Drawing Sheets

(a)

(b)

(a)

(b)

(c)

BACKUP TECHNIQUE FOR RECORDING DEVICES EMPLOYING DIFFERENT STORAGE FORMS

CROSS-REFERENCE TO RELATED APPLICATIONS

This application is a continuation of U.S. patent application Ser. No. 10/449,577, filed May 30, 2003 now U.S. Pat No. 7,162,597, titled "Backup technique for recording devices employing different storage forms", which is incorporated herein by this reference.

BACKGROUND

1. Technical Field

The present invention relates to a backup technique for recording devices that employ different storage forms, and relates in particular to a backup system for data stored in a block form and a file form, a recording device, a storage form conversion device and a program therefor and a recording medium for recording this program.

2. Description of Related Art

There is a case wherein for an SAN (Storage Area Network) an application server that accesses data by designating a block and a file server that accesses data by designating a file name are employed together. Present in the same SAN are a block form disk system that stores in a block form data used by the application server and a file form disk system that stores in a file form data used by the file server.

In the SAN, the application server performs, at a block level, the backup of data in the block form disk system, and the file server performs, at a file level, the backup of data in the file form disk system.

[Problems to be Solved by the Invention]

In such an SAN, in order to perform the backup of data in the block form disk system, the application server includes a backup management software program for performing the backup of data at a block level, while in order to perform the backup of data in the file form disk system, the file server includes a backup management software program for performing the backup of data at a file level. Since in the SAN the two backup management software programs are both employed for the backup of data, the operation of the backup system becomes overly complicated.

SUMMARY

It is, therefore, one object of the present invention to provide a backup system, a recording device, a storage form conversion device, a recording medium and a program that can resolve this shortcoming. This object can be achieved by combining the characteristics of the independent claims of the present invention, and the dependent claims that define further effective, specific examples of the invention.

[Solutions to the Problems]

According to a first aspect of the present invention, a backup system comprises:
   a first storage unit for storing first data using a first storage form;
   a second storage unit for storing second data using a second storage form;
   a backup storage unit for storing backup data for the first data and the second data;
   a storage form converter for converting into data for the second storage form the first data stored in the first storage form by the first storage unit; and
   a backup manager for copying into the backup storage unit the first data and the second data stored in the second storage form by the second storage unit.

According to a second aspect of the invention, a recording device for managing data in a block form, which is a storage form that is accessed by directly designating a storage location, comprises:
   a storage unit for storing data in a block form, which is a storage form that is accessed by directly designating a storage location; and
   a storage form converter for converting data stored in the storage unit into a file form, which is a storage form that is accessed by designating a file name, and for storing the data in the file form in another recording device, which stores data in a file form.

According to a third aspect of the invention, a recording device for managing data in a file form, which is a storage form that is accessed by designating a file name, comprises:
   a storage unit for storing data in a file form, which is a storage form that is accessed by designating a file name; and
   a storage form converter for obtaining data from another recording device that stores data in a block form, which is a storage form that is accessed by directly designating a storage location, and for converting the data into a file form and storing the obtained data in the storage unit.

According to a fourth aspect of the invention, a storage form conversion device for converting a data storage form comprises:
   a data receiver for receiving data from a first recording device that stores data in a block form, which is a storage form that is accessed by directly designating a storage location;
   a storage form converter for converting the data received by the data receiver into data in a file form, which is a storage form that is accessed by designating a file name; and
   a data transmitter for transmitting the data converted by the storage form converter to a second recording device, so as to store the data in the second recording device that stores data in a file form.

DETAILED DESCRIPTION

Preferred Embodimemt of the Invention

The present invention will now be described by referring to one embodiment; however, the present invention is not limited to this embodiment, and not all the combinations of characteristics explained in the embodiment are always requisite for achieving the invention.

Figure 1:
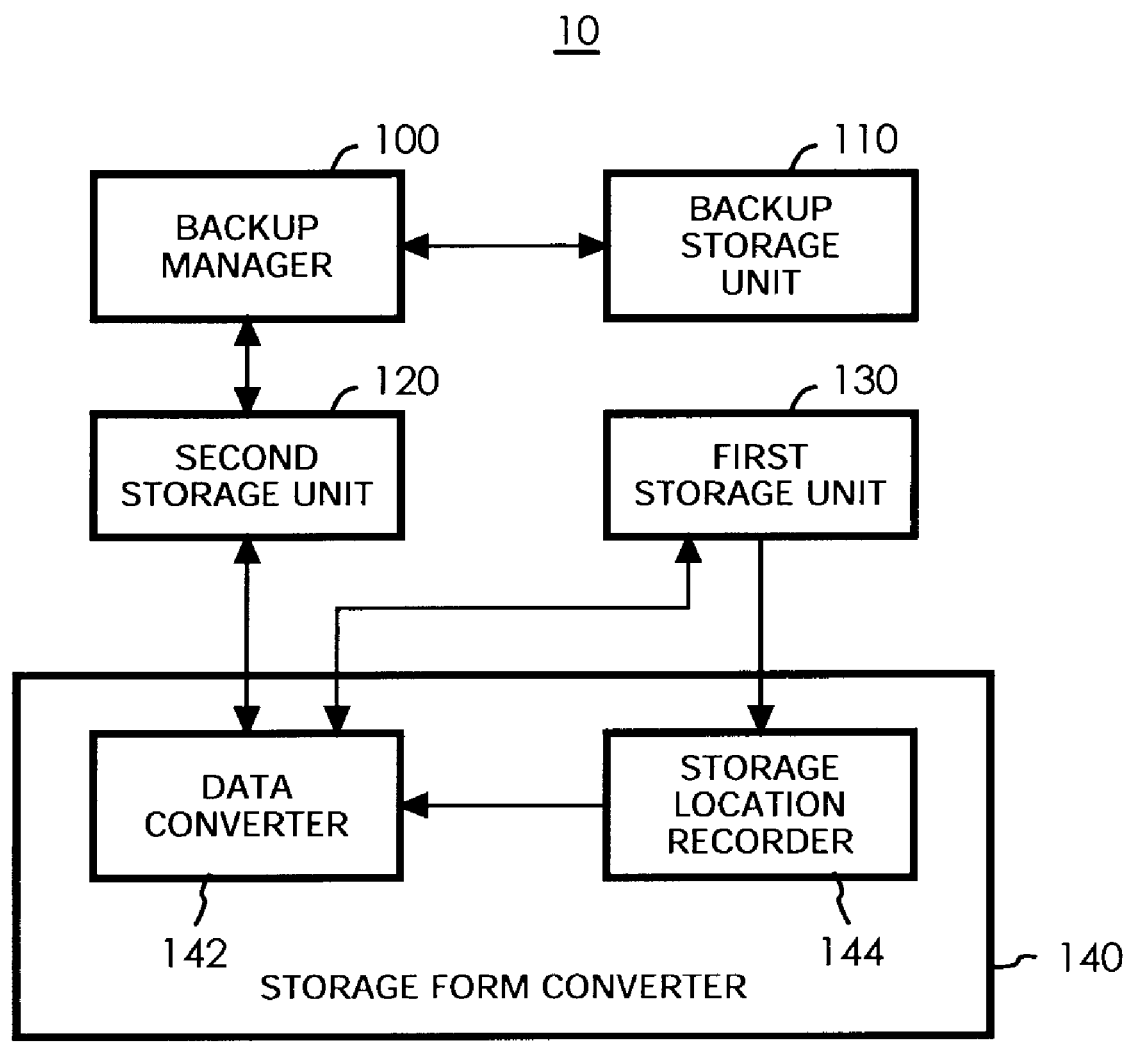
FIG. 1 is a diagram showing an example functional configuration for a backup system 10 according to one embodiment of the present invention.

FIG. 1 is a diagram showing an example functional configuration for a backup system 10 according to the embodiment of the present invention. The backup system 10 comprises: a first storage unit 130 for storing data in a first storage form; a second storage unit 120 for storing data in a second storage form; a backup storage unit 110 for storing backup data for the data stored in the first storage unit 130 and in the second storage unit 120; a storage form converter 140 for converting into data in a second storage form the data in the first storage form stored in the first storage unit 130, and for storing in the second storage unit 120 the data in the second form; and a backup manager 100 for copying to the backup storage unit 110 the data in the second storage form stored in the second storage unit 120.

The storage form converter 140 includes a storage location recorder 144 for recording the storage location in the first storage unit 130 of the data for the backup, and a data converter 142 for converting into data in the second storage form the data stored at the location recorded by the storage location recorder 144.

During the data backup processing, the storage form converter 140 converts into data in the second storage form the data stored in the first storage unit 130, and stores the data in the second storage form in the free space in the second storage unit 120. Then, using the second storage form, the second storage unit 120 stores the data that was stored in the first storage unit 130 and the data that was stored in the second storage unit 120. Thereafter, without being aware of whether the data was stored in the first storage unit 130 or in the second storage unit 120, the backup manager 100 copies into the backup storage unit 110 all the data in the second storage form stored in the second storage unit 120.

In addition, during the data recovery processing, the backup manager 100 reads data from the backup storage unit 110 without being aware of whether the data should be stored in the first storage unit 130 or in the second storage unit 120, and, using the second storage form, stores the data in the second storage unit 120. Then, the storage form converter 140 converts into data in the first storage form the data that is stored in the second storage unit 120 and that should be stored in the first storage unit 130, and stores the obtained data in the first storage form in the first storage unit 130.

According to the backup system 10 of this embodiment, when the backup manager 100 performs the backup of data stored in the second storage unit 120, the backup and the recovery of data stored both in the first storage unit 130 and in the second storage unit 120 can be performed. Therefore, the backup manager 100 need only perform the backup and the recovery of data corresponding to the second storage form, so that the backup or recovery of both the data in the first storage form and the data in the second storage form can be performed.

Figure 2:
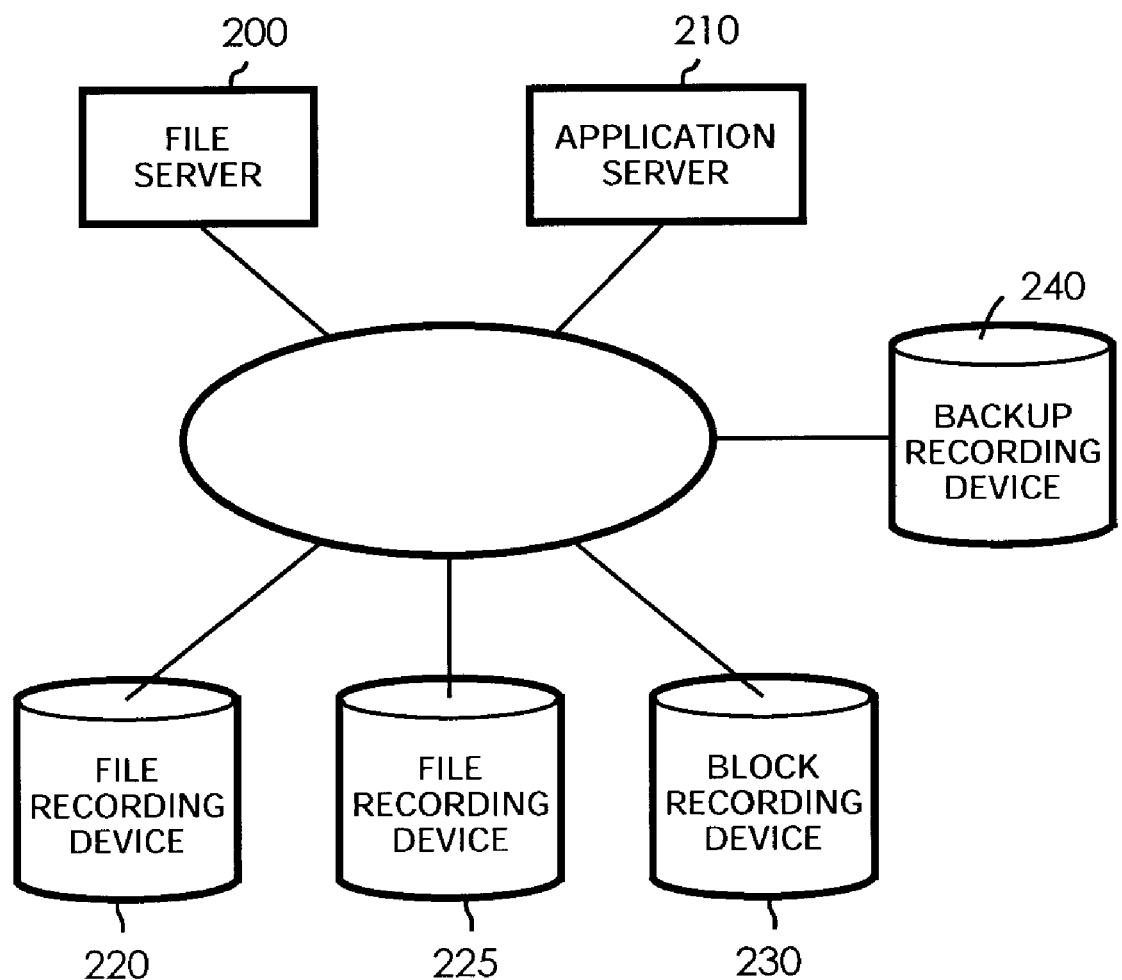
FIG. 2 is a diagram showing an example hardware configuration for the backup system 10.

FIG. 2 is a diagram showing a first example for the hardware configuration of the backup system 10. The backup system 10 in this example includes a file server 200, an application server 210, a file recording device 220, a file recording device 225, a block recording device 230 and a backup recording device 240. The file recording device 220, the file recording device 225 and the block recording device 320 are, for example, disk systems and the backup recording device 240 is, for example, a tape medium. In this embodiment, the backup system 10 is constituted as a ring network, but may also be formed across an arbitrary network, such as the Internet.

The file recording devices 220 and 225 are examples for the second storage units 120 (FIG. 1), and manage data in a file form, which is the second storage form. The block recording device 230 is an example for the first storage unit 130 (FIG. 1), and manages data in a block form, which is the first storage form. The backup recording device 240 is an example for the backup storage unit 110 (FIG. 1), and stores as backup data the data stored in the file recording device 220, the file recording device 225 and the block recording device 230.

The block form is a data storage form that is accessed by directly designating the storage location of the data in the recording device. The file form is a data storage form that is accessed by designating the file name of the data.

The file server 200 updates data or adds data by accessing the file recording devices 220 and 225. Further, the file server 200 is an example for the backup manager 100 (FIG. 1), and the data in the file form stored in the file recording devices 220 and 225 are copied to the backup recording device 240. Also, the file server 200 copies to the file recording device the data stored in the backup recording device 240.

Furthermore, the application server 210 executes a program, such as a database management program, having as a function the accessing of data stored in the block form, and updates or adds data by accessing the block recording device 230.

The block recording device 230 includes the storage location recorder 144 (FIG. 1), which, when data stored in the block recording device 230 is updated or new data is added, records the storage location of the pertinent data. The file recording devices 220 and 225 include the data converter 142 (FIG. 1), which converts, into data in the file form, data in the block form stored at the block storage location that is recorded by the block recording device 230, and stores the data in the file form in the file recording device 220 or 225. At this time, the file recording device 220 or 225 allocates one file name for multiple blocks of data stored in the block recording device 230, and stores, in correlation with the file name, the storage locations of the blocks in the block recording device 230 and the data in the blocks.

It is preferable that the storage location recorder 144 of the block recording device 230 be operated based on the firmware stored in the nonvolatile memory of the block recording device 230. It is further preferable that the data converters 142 of the file recording devices 220 and 225 be operated based on the firmware stored in the nonvolatile memories of the file recording devices 220 and 225.

As another example, the file recording devices 220 and 225 may also include storage form converters 140, for each of which a data converter 142 and a storage location recorder 144 are provided. That is, for the file recording devices 220 and 225, the second storage units 120 and the storage form converters 140 may be provided. In this example, the storage form converters 140 for the file recording devices 220 and 225 may convert, into data in the file form, data obtained from the block recording device 230, which stores data in the block form, and may store the data, in the file form, in the second storage units 120 of the file recording devices 220 and 225.

As an additional example, the block recording device 230 may include a storage form converter 140 (FIG. 1), for which a data converter 142 and a storage location recorder 144 are provided. That is, the block recording device 230 may include a first storage unit 120 and a storage form converter 140. In this example, the storage form converter 140 of the block recording device 230 may convert, into data in the file form, the data in the block form stored in the first storage unit 130 of the block recording device 230, and may store the data in the file form in the file recording device 220 or 225.

Further, the storage form converter 140 of the block recording device 230 may select either the file recording device 220 or 225, whichever has the larger free memory space, to store the obtained data in the file form.

According to the backup system 10 in the first example, the file server 200 can collectively employ the file form to perform the backup of data in the block form stored by the block recording device 230 and the data in the file form stored by the file recording devices 220 and 225. Therefore, the backup system 10 can be operated easily.

Figure 3:
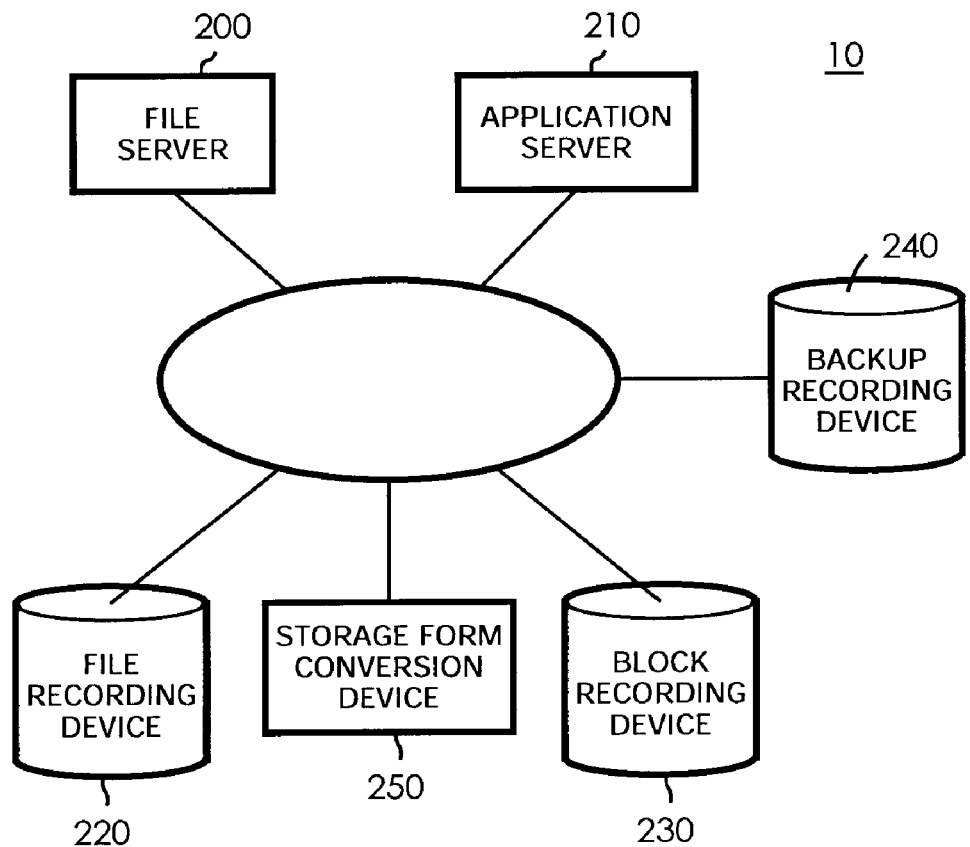
FIG. 3A is a diagram showing a second example hardware configuration for the backup system 10.
FIG. 3B is a diagram showing an example functional configuration for a storage form conversion device 250.
Figure 3:
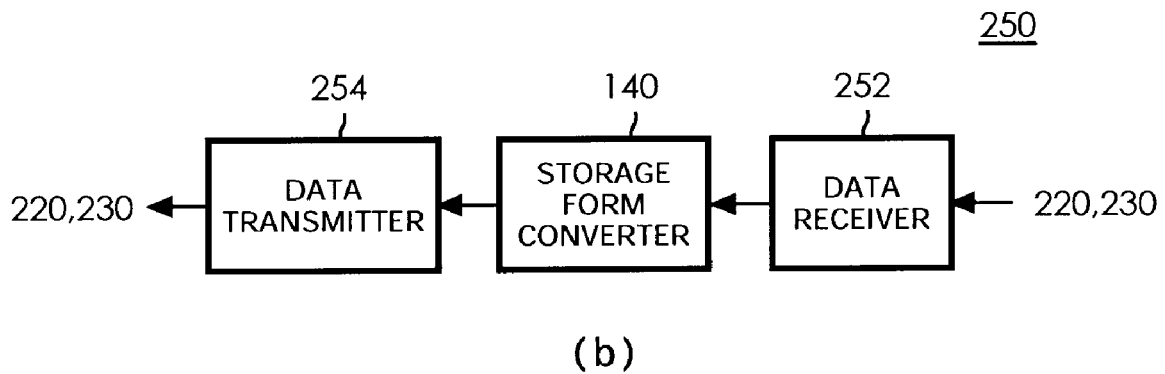

FIG. 3A is a diagram showing a second example for the hardware configuration of the backup system 10. In this example, the same reference numerals as are used for the backup system 10 in the first example are employed to denote corresponding components. In the second example, full explanations will be given for configurations and operations that differ from those in the first example, and partial explanations will be given for configurations and operations provided in the first example.

In addition to the hardware configuration for the first example (FIG. 2), the backup system 10 for this example includes a storage form conversion device 250 for converting a data storage form. That is, the file recording device 220 includes the second storage unit 120 (FIG. 1), and the block recording device 230 includes the first storage unit 130.

FIG. 3B is a diagram showing an example functional configuration for the storage form conversion device 250. The storage form conversion device 250 includes a data receiver 252, a storage form converter 140 and a data transmitter 254.

During the data backup processing, the data receiver 252 receives data from the block recording device 230 for storing data in the block form. The storage form converter 140 converts, into data in the file form, the data received from the data receiver 252. While the data transmitter 254 transmits the data obtained by the storage form converter 140 to the file recording device 220 in order to store the data in the file form.

During the data recovery processing, the data receiver 252 receives data from the file recording device 220, which stores data in the file form. The storage form converter 140 then converts the data received by the data receiver 252 into the block form. And the data transmitter 254 transmits the data obtained by the storage form converter 140 to the block recording device 230 in order to store therein the data in the block form.

According to the backup system 10 in the second example, since the storage form conversion device 250 for relaying data, converting the storage form and relaying the data is provided between the file recording device 220 and the block recording device 230, the file recording device 220 and the block recording device 230 need not have a function for converting the storage form, so that the recording device can be easily added or replaced.

The storage form converter 140 in this embodiment converts, into data in the file form, data stored by the block recording device 230 in the block form, and stores the data in the file recording device 220 or 225 in the file form. In another example, the data stored in the file recording devices 220 and 225 in the file form may be converted into data in the block form, and this data may be stored in the block recording device 230. In this case, the file server 200 may copy, to the backup recording device 240, the data stored in the block recording device 230 in the block form.

Figure 4:
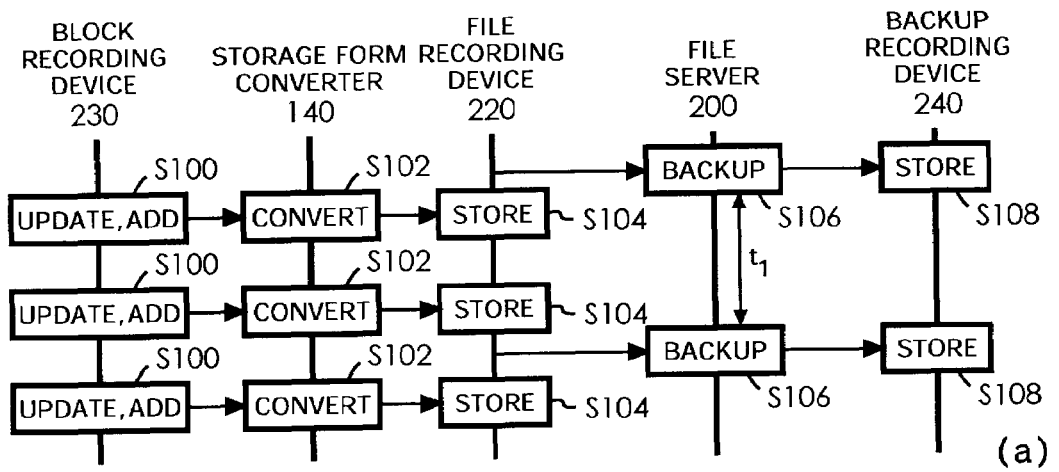
FIG. 4A is a flowchart showing a first example operation for the backup system 10.
FIG. 4B is a flowchart showing a second example operation for the backup system 10.
FIG. 4C is a flowchart showing a third example operation for the backup system 10.
Figure 4:
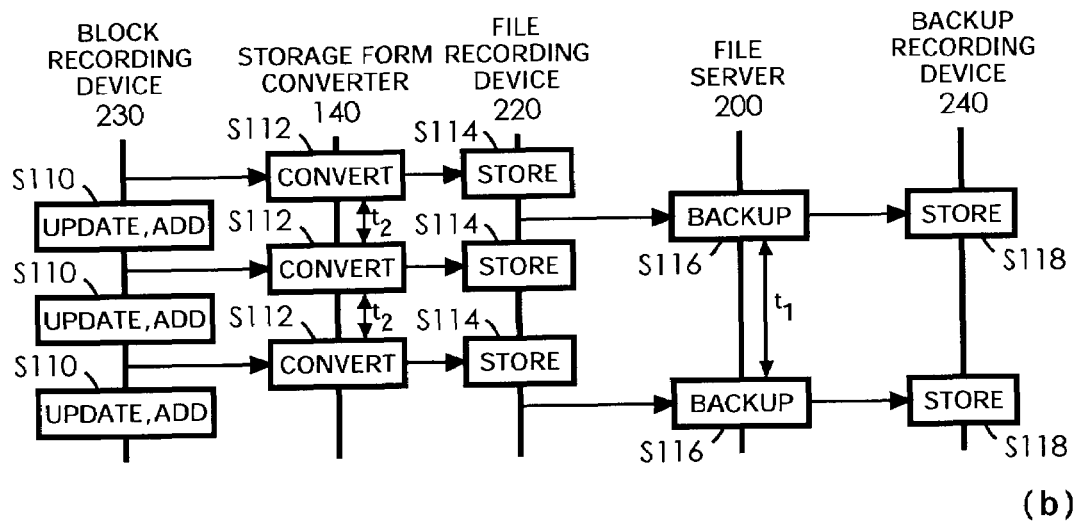
Figure 4:
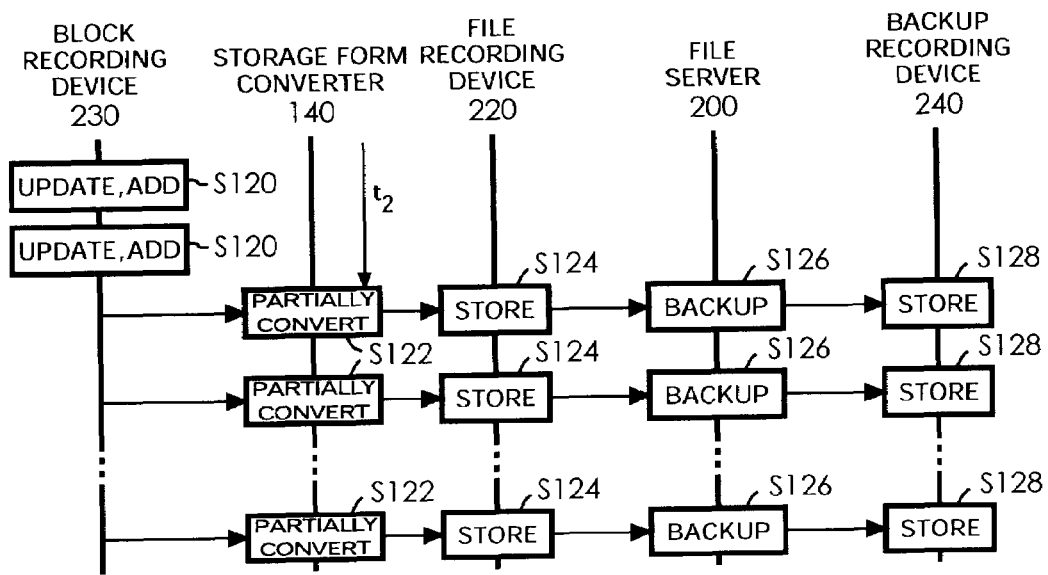

FIG. 4A is a flowchart showing a first example operation for the backup system 10. The application server 210 updates the data stored in, or adds data to the block recording device 230 (S100), and each time the data stored in the block recording device 230 is updated or data is added thereto, the storage form converter 140 converts the updated or added data into the file form (S102), and stores the obtained data in the file recording device 220 (S104). Further, for each time interval $t_1$, the file server 200 copies to the backup recording device data that has been newly added to or updated by the file recording device 220 (S106). Through these operations, the backup recording device 240 stores backup data for the data stored in the block recording device 230 and the file recording device 220 (S108).

FIG. 4B is a flowchart showing a second example operation for the backup system 10. The application server 210 updates data stored in, or adds data to the block recording device 230 (S110). Further, for each time interval $t_2$, the storage form converter 140 converts, into data in the file form, data that has been newly added to or updated by the block recording device 230 (S112), and stores the obtained data in the file recording device 220 (S114). Further, for each time interval $t_1$, the file server 200 copies to the backup recording device data that has been newly added to or updated for the file recording device 220 (S116). Through these operations, the backup recording device 240 stores backup data for the data stored in the block recording device 230 and the file recording device 220 (S118). It is, therefore, preferable that the time interval $t_2$ be longer than the time interval $t_1$.

FIG. 4C is a flowchart showing a third example operation for the backup system 10. The application server 210 adds data to or updates data stored in the block recording device 230 (S120), and, for each time interval $t_2$, the storage form converter 140 divides, into multiple segments, data that have been newly added to or updated for the block recording device 230, converts each data segment into the file form (S122), and stores the obtained data segments in the file recording device 220 (S124). Each time a data segment is added to the file recording device 220, the file server 200 copies the newly added data to the backup recording device (S126). Through these operations, the backup recording device 240 stores backup data for the data stored in the block recording device 230 and the file recording device 220 (S128). During the operation in this example, the backup of the data in the block recording device 230 is ensured even when only a small free space is available in the file recording device 220.

According to the operation in this embodiment, since the file server 200 performs the backup of data in the file recording device 220, a backup can be made for the updated or added data in the file recording device 220 and the block recording device 230.

Figure 5:
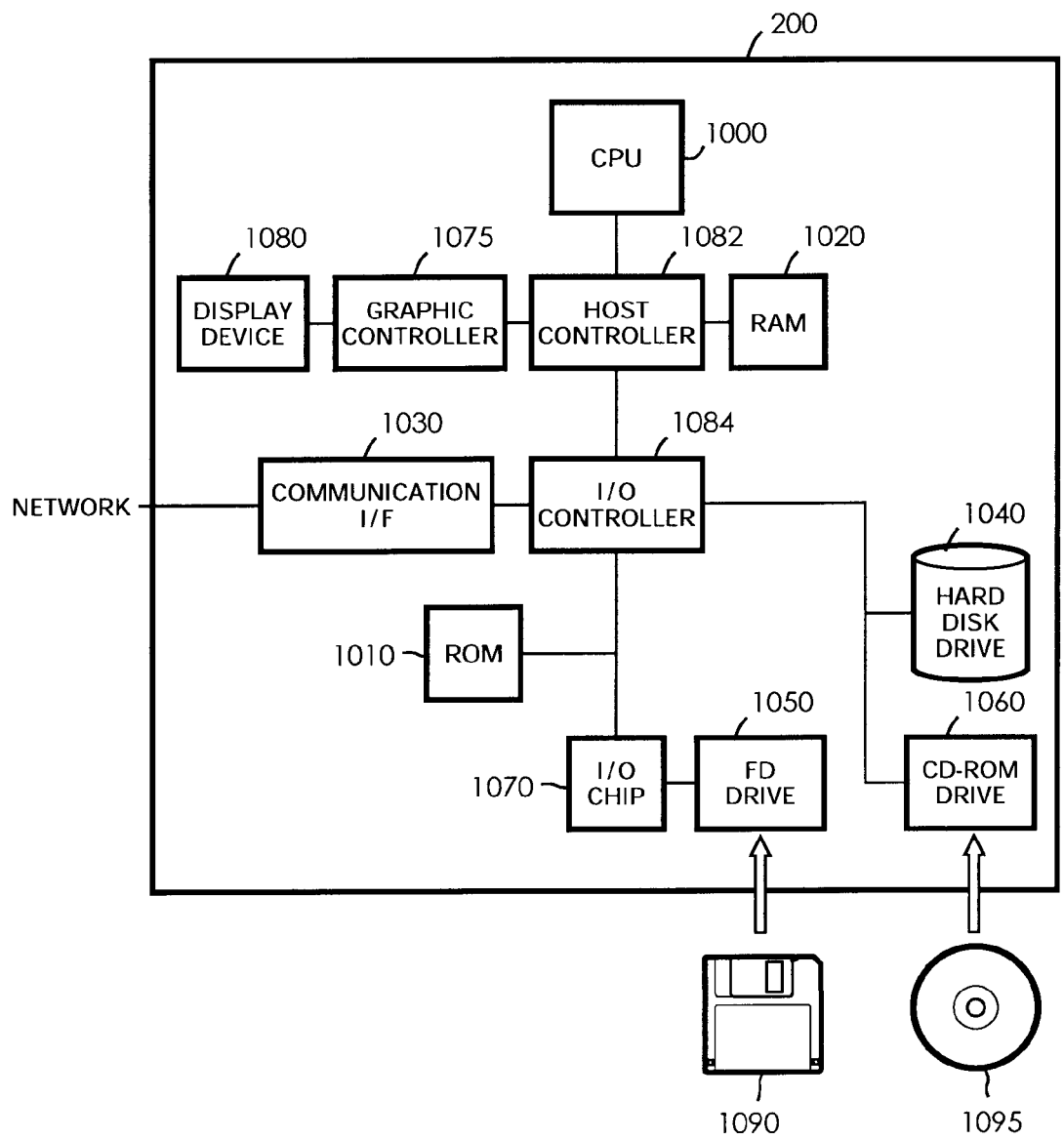
FIG. 5 is a diagram showing an example hardware configuration for a file server 200.

FIG. 5 is a diagram showing an example hardware configuration for the file server 200. The file server 200 in this embodiment comprises: a CPU periphery section that includes a display device 1080, and a CPU 1000, a RAM 1020 and a graphic controller 1075, which are interconnected by a host controller 1082; an input/output section that includes a communication interface 1030, a hard disk drive 1040 and a CD-ROM drive 1060, which are connected to the host controller 1082 by an input/output controller 1084; and a legacy input/output section that includes a ROM 1010, a floppy disk drive 1050 and an input/output chip 1070, which are connected to the input/output controller 1084.

The host controller 1082 connects the RAM 1020 to the CPU 1000, which accesses the RAM 1020 at a high transfer rate, and the graphic controller 1075. The CPU 1000, the operation of which is based on programs stored in the ROM 1010 and the RAM 1020, controls the individual sections, while the graphic controller 1075 obtains image data that the CPU 1000, for example, generates in a frame buffer provided in the RAM 1020, and displays the image data on the display device 1080. Instead of this, however, the graphic controller 1075 may internally include a frame buffer for storing image data generated by the CPU 1000.

The input/output controller 1084 connects the host controller 1082 to the communication interface 1030, which is a comparatively fast input/output device, the hard disk drive 1040 and the CD-ROM drive 1060. The communication interface 1030 communicates with another device across a network, while the hard disk drive 1040 stores programs and data, used by the file server 200, that the CD-ROM drive 1060 reads from a CD-ROM 1095 and transmits to the input/output chip 1070 through the RAM 1020.

The input/output controller 1084 also connects the ROM 1010 to comparatively slow input/output devices, such as the floppy disk drive 1050 and the input/output chip 1070. The ROM 1010 is used to store a boot program that the CPU 1000 executes as the file server 200 is activated, and a program that depends on the hardware of the file server 200. The floppy disk drive 1050 reads a program or data from the floppy disk 1090, and transmits the program or data to the input/output chip 1070 through the RAM 1020. The input/output chip 1070 connects the floppy disk 1090 to the various input/output devices through a parallel port, a serial port, a keyboard port and a mouse port, for example. The input/output chip 1070 receives, from an input/output device, data entered by a user, and transmits the data to a program executed by the file server 200.

A program that implements the function of the file server 200 includes a backup management module. This module is a program that permits the file server 200 to serve as the backup manager 100.

A program that implements the function of the file recording device 220 includes a storage module. This program may also include either a data conversion module or a storage form conversion module, which is a program that permits the file recording device 220 to serve as the second storage unit 120, the data converter 142 or the storage form converter 140.

A program that implements the function of the block recording device 230 includes a storage module. This program may include either a storage location recording module or a storage form conversion module, which is a program that permits the block recording device 230 to serve as the first storage unit 130, the storage location recorder 144 or the storage form converter 140.

A program that implements the function of the storage form conversion device 250 includes a storage form conversion module, a data conversion module, a storage location recording module, a data reception module and a data transmission module, which are programs that permit the storage form conversion device 250 to serve as the storage form converter 140, the data converter 142, the storage location recorder 144, the data receiver 252 and the data transmitter 254.

A program is provided for the file server 200, the file recording device 220, the block recording device 230 or the storage form conversion device 250 by a user, while stored on a floppy disk 1090, a CD-ROM 1095 or another recording medium, such as an IC card. The program provided for the file server 200 is read from a recording medium, is installed in the file server 200 through the input/output chip 1070, and is executed by the file server 200. Further, a program provided for the file recording device 220, the block recording device 230 or the storage form conversion device 250 is installed through a communication interface 1030 in the file recording device 220, the block recording device 230 or the storage form conversion device 250, and is executed by the file server 200, the file recording device 220, the block recording device 230 or the storage form conversion device 250.

The programs or the above modules may be stored on an external storage medium. This storage medium can not only be a floppy disk 1090 or a CD-ROM 1095, but can also be an optical recording medium such as a DVD or PD, a magneto-optical recording medium such as an MD, a tape medium or a semiconductor memory such as an IC card. In addition, a storage device, such as a hard disk or a RAM provided for a server system connected to a private communication network or the Internet, may be employed as a recording medium, and programs may be provided through the network.

The present invention has been explained by referring to the embodiment; however, the technical scope of the invention is not limited to that described in the embodiment. The embodiment can be variously modified or improved, and as is obvious from the claims for the invention, such a modification or improvement can be included within the technical scope of the invention.

As is described above, according to the embodiment, the backup system, the recording device, the storage form conversion device, and the recording medium and the programs therefor in the following entries are implemented.

(Entry 1) A backup system comprising:

a first storage unit for storing first data using a first storage form;

a second storage unit for storing second data using a second storage form;

a backup storage unit for storing backup data for the first data and the second data;

a storage form converter for converting into data for the second storage form the first data stored in the first storage form by the first storage unit; and a backup manager for copying into the backup storage unit the first data and the second data stored in the second storage form by the second storage unit.

(Entry 2) A backup system according to Entry 1, wherein the first storage unit stores the first data using a block form, which is a storage form that can be accessed by directly designating a storage location; wherein the second storage unit stores the second data using a file form, which is a storage form that can be accessed by designating a file name; and wherein the storage form converter converts into data in the file form the first data in the block form stored by the first storage unit, and stores the data in the file form in the second storage unit.

(Entry 3) A backup system according to Entry 2, wherein the storage form converter allocates one file name for multiple blocks of the first data stored by the first storage unit, and, in correlation with the file name, stores in the second storage unit the first data and the locations of the multiple blocks stored in the first storage unit.

(Entry 4) A backup system according to Entry 1, wherein for each first time interval the storage form converter converts into the second storage form the first data that is updated or added to, and stores the obtained data in the second storage form in the second storage unit; and wherein, for each second time interval, which is equal to or longer than the first time interval, the backup manager copies to the backup storage unit the first data and the second data stored in the second storage unit.

(Entry 5) A backup system according to Entry 1, wherein when the first data stored in the first storage unit is updated or is added to, the storage form converter converts the first data into data in the second storage form and stores the obtained data in the second storage unit; and wherein, for each predetermined time interval, the backup manager copies to the backup storage unit the first data and the second data stored in the second storage unit.

(Entry 6) A backup system according to Entry 1, wherein, when the first data stored in the first storage unit is updated or added to, the storage form converter divides the first data into multiple data segments and converts each of the data segments into the second storage form and stores the obtained data in the second storage unit; and wherein, when the data segments of the first data are added to the second storage unit, the backup manager copies the data segments to the backup storage unit.

(Entry 7) A backup system according to Entry 1, wherein the storage form converter includes
a storage location recorder for, when the first data is updated or added to, recording the storage location of the first data in the first storage unit, and
a data converter for converting into the second storage form the first data located at the storage location that is recorded by the storage location recorder.

(Entry 8) A backup system according to Entry 7, wherein the storage location recorder is operated based on firmware stored in nonvolatile memory provided for the first storage unit.

(Entry 9) A backup system according to Entry 7, wherein the data converter is operated based on firmware stored in nonvolatile memory provided for the second storage unit.

(Entry 10) A backup system according to Entry 1, further comprising:
a plurality of the second storage units,
wherein the storage form converter converts the first data into the second storage form, and stores the obtained data in the second storage units having large free memory spaces.

(Recording Device 1)

(Entry 11) A recording device for managing data in a block form, which is a storage form that is accessed by directly designating a storage location, comprising:
a storage unit for storing data in a block form, which is a storage form that is accessed by directly designating a storage location; and
a storage form converter for converting data stored in the storage unit into a file form, which is a storage form that is accessed by designating a file name, and for storing the data in the file form in another recording device, which stores data in a file form.

(Entry 12) A recording device for managing data in a file form, which is a storage form that is accessed by designating a file name, comprising:
a storage unit for storing data in a file form, which is a storage form that is accessed by designating a file name; and
a storage form converter for obtaining data from another recording device that stores data in a block form, which is a storage form that is accessed by directly designating a storage location, and for converting the data into a file form and storing the obtained data in the storage unit.

(Entry 13) A storage form conversion device for converting a data storage form comprising:
a data receiver for receiving data from a first recording device that stores data in a block form, which is a storage form that is accessed by directly designating a storage location;
a storage form converter for converting the data received by the data receiver into data in a file form, which is a storage form that is accessed by designating a file name; and
a data transmitter for transmitting the data converted by the storage form converter to a second recording device, so as to store the data in the second recording device that stores data in a file form.

(Entry 14) A program, for a recording device for managing data in a block form that is a storage form that is accessed by directly designating a storage location, that permits the recording device to function as:
a storage unit for storing data in a block form, which is a storage form that is accessed by directly designating a storage location; and
a storage form converter for converting data stored in the storage unit into a file form, which is a storage form that is accessed by designating a file name, and for storing the data in the file form in another recording device, which stores data in a file form.

(Entry 15) A program, for a recording device for managing data in a file form that is a storage form that is accessed by designating a file name, that permits the recording device to function as:
a storage unit for storing data in a file form, which is a storage form that is accessed by designating a file name; and
a storage form converter for obtaining data from another recording device that stores data in a block form, which is a storage form that is accessed by directly designating a storage location, and for converting the data into a file form and storing the obtained data in the storage unit.

(Entry 16) A program, for a storage form conversion device for converting a data storage form, that permits the storage form conversion device to function as:
a data receiver for receiving data from a first recording device that stores data in a block form, which is a storage form that is accessed by directly designating a storage location;
a storage form converter for converting the data received by the data receiver into data in a file form, which is a storage form that is accessed by designating a file name; and
a data transmitter for transmitting the data converted by the storage form converter to a second recording device, so as to store the data in the second recording device that stores data in a file form.

(Entry 17) A recording medium for storing a program for a recording device for managing data in a block form, which is a storage form that is accessed by directly designating a storage location, wherein the program permits the recording device to function as:
- a storage unit for storing data in a block form, which is a storage form that is accessed by directly designating a storage location; and
- a storage form converter for converting data stored in the storage unit into a file form, which is a storage form that is accessed by designating a file name, and for storing the data in the file form in another recording device, which stores data in a file form.

(Entry 18) A recording medium for storing a program for a recording device for managing data in a file form, which is a storage form that is accessed by designating a file name, wherein the program permits the recording device to function as:
- a storage unit for storing data in a file form, which is a storage form that is accessed by designating a file name; and
- a storage form converter for obtaining data from another recording device that stores data in a block form, which is a storage form that is accessed by directly designating a storage location, and for converting the data into a file form and storing the obtained data in the storage unit.

(Entry 19) A recording medium for storing a program for a storage form conversion device for converting a data storage form, wherein the program permits the storage form conversion device to function as:
- a data receiver for receiving data from a first recording device that stores data in a block form, which is a storage form that is accessed by directly designating a storage location;
- a storage form converter for converting the data received by the data receiver into data in a file form, which is a storage form that is accessed by designating a file name; and
- a data transmitter for transmitting the data converted by the storage form converter to a second recording device, so as to store the data in the second recording device that stores data in a file form.

(Entry 20) A storage form conversion device for converting a data storage form, comprising:
- a data receiver configured to receive data from a first recording device that stores data in a block form, wherein the block form is a storage form wherein data is accessed by directly designating a storage location;
- a storage form converter configured to convert the data received by the data receiver into data in a file form, wherein the file form is a storage form wherein data is accessed by designating a file name; and
- a data transmitter configured to transmit the data converted by the storage form converter to a second recording device wherein the converted data is stored in the file form.

(Entry 21) A program, embodied in a storage medium, for a recording device for managing data in a block form, wherein the program comprises:
- a storage module configured to store data in the block form, wherein the block form is a storage form wherein data is accessed by directly designating a storage location; and
- a storage form converter module configured to convert data stored by the storage module into a file form, and to store the data in the file form in a second recording device which stores data in the file form, wherein the file form is a storage form wherein data is accessed by designating a file name.

(Entry 22) A program, embodied in a storage medium, for a recording device for managing data in a file form, wherein the program comprises:
- a storage module configured to store data in the file form, wherein the file form is a storage form wherein data is accessed by designating a file name; and
- a storage form converter module configured to obtain data from a second recording device that stores data in a block form, and to convert the data obtained from the second recording device into a file form and to store the converted data with the storage module, wherein the block form is a storage form wherein data is accessed by directly designating a storage location.

(Entry 23) A program, embodied in a storage medium, for a storage form conversion device for converting a data storage form, wherein the program comprises:
- a data receiver module configured to receive data from a first recording device that stores data in a block form, wherein the block form is a storage form wherein data is accessed by directly designating a storage location;
- a storage form converter module configured to convert the data received by the data receiver module into data in a file form, wherein the file form is a storage form wherein data is accessed by designating a file name; and
- a data transmitter module configured to transmit the data converted by the storage form converter module to a second recording device wherein the converted data is stored in the file form.

(Entry 24) A method for storing backup data, comprising the following operations:
- updating data in a block recording device;
- converting the updated data into a file format;
- storing the converted data in a file recording device; and
- for each time interval $t_1$, copying the converted data from the file recording device to a backup recording device.

(Entry 25) A method for storing backup data, comprising the following operations:
- adding data to a block recording device;
- for each time interval $t_2$, converting the added data into a file format;
- storing the converted data in a file recording device; and
- for each time interval $t_1$, copying the converted data from the file recording device to a backup recording device.

(Entry 26) A method for storing backup data, comprising the following operations:
- adding data to a block recording device;
- for each time interval $t_2$, dividing the added data into segments;
- converting each segment into a file format;
- storing the converted segments in a file recording device; and
- copying each segment from the file recording device to a backup recording device.

(Entry 27) A backup device, comprising:
- means for updating data in a block recording device;
- means for converting the updated data into a file format;
- means for storing the converted data in a file recording device; and
- means for, for each time interval $t_1$, copying the converted data from the file recording device to a backup recording device.

ADVANTAGES OF THE INVENTION

As is apparent from the above explanation, according to the present invention, a backup system can be provided that can collectively perform the backup of data in a block form stored by a block recording device and the backup of data in a file form stored by a file recording device.

What is claimed is:

1. A backup system, comprising:
   a first storage unit configured to store first data using a first storage form;
   a second storage unit configured to store second data using a second storage form;
   a backup storage unit configured to store backup data for the first data and the second data;
   a storage form converter configured to convert into data for the second storage form, the first data stored in the first storage form by the first storage unit, wherein the storage form converter is coupled to the first storage unit and the second storage unit, and wherein for each time interval $t_2$, the storage form converter divides into multiple data segments, first data that have been newly added to or updated to the first storage unit, and converts each data segment into the second storage form, and stores the converted data segments in the second storage unit; and
   a backup manager coupled to the second storage unit and the backup storage unit, wherein the backup manager is configured to copy into the backup storage unit the first data and the second data stored in the second storage form, without being aware of whether the data was stored in the first storage unit or in the second storage unit, and wherein each time a converted data segment is stored in the second storage unit, the backup manager is configured to copy the converted data segment that is stored in the second storage unit to the backup storage unit.

2. The backup system according to claim 1:
   wherein the first storage unit is configured to store the first data using a block form, wherein the block form is a storage form wherein data is accessed by directly designating a storage location;
   wherein the second storage unit is configured to store the second data using a file form, wherein the file form is a storage form wherein data is accessed by designating a file name; and
   wherein the storage form converter is configured to convert the first data in the block form stored by the first storage unit into data in the file form, and to store the data in the file form in the second storage unit.

3. The backup system according to claim 2, wherein the storage form converter is configured to allocate one file name for multiple blocks of the first data stored by the first storage unit, and, in correlation with the file name, to store in the second storage unit the first data and the locations of the multiple blocks stored in the first storage unit.

4. The backup system according to claim 1:
   wherein the storage form converter is configured to, for each first time interval, convert into the second storage form first data that is updated or added to, and to store the converted data in the second storage form in the second storage unit; and
   wherein, the backup manager is configured to, for each second time interval, which is equal to or longer than the first time interval, copy to the backup storage unit the first data and the second data stored in the second storage unit.

5. The backup system according to claim 4, wherein the storage form converter is further configured to convert data stored in the second storage form, into the first storage form.

6. The backup system according to claim 1:
   wherein the storage form converter is configured to, when the first data stored in the first storage unit is updated or is added to, convert the first data into data in the second storage form and to store the converted data in the second storage unit; and
   wherein, the backup manager is configured to, for each predetermined time interval, copy to the backup storage unit the first data and the second data stored in the second storage unit.

7. The backup system according to claim 6, wherein the storage form converter is further configured to convert data stored in the second storage form, into the first storage form.

8. The backup system according to claim 1:
   wherein the storage form converter is further configured to convert data stored in the second storage form, into the first storage form;
   and wherein the backup manager is further configured to read from the backup storage unit, data that was copied to the backup storage unit, without being aware of whether the data to be read should be stored in the first storage unit or in the second storage unit.

9. The backup system according to claim 1, wherein the storage form converter includes:
   a storage location recorder configured to record the storage location of the first data in the first storage unit, when the first data is updated or added to, and
   a data converter configured to convert into the second storage form the first data located at the storage location that is recorded by the storage location recorder.

10. The backup system according to claim 9, wherein the first storage unit includes firmware stored in nonvolatile memory, and wherein the storage location recorder is implemented by the firmware in the first storage unit.

11. The backup system according to claim 9, wherein the second storage unit includes firmware stored in nonvolatile memory, and wherein the data converter is implemented by the firmware in the second storage unit.

12. The backup system according to claim 1, further comprising:
   a plurality of the second storage units;
   and wherein the storage form converter is configured to convert the first data into the second storage form, and to store the converted data in one of the second storage units that has free memory space.

13. A backup system, comprising:
   a first storage unit configured to store first data using a block storage form;
   a second storage unit configured to store second data using a file storage form;
   a backup storage unit configured to store backup data for the first data and the second data;
   a storage form converter configured to convert into data into the file storage form, the first data stored in the block storage form by the first storage unit, wherein the storage form converter is coupled to the first storage unit and the second storage unit, and wherein the storage form converter divides into multiple data segments, first data that have been newly added to or updated to the first storage unit, and converts each data segment into the file storage form, and stores the converted data segments in the second storage unit, and wherein the storage form converter is further configured to convert data stored in the file storage form, into the block storage form; and a backup manager coupled to the second storage unit and the backup storage unit, wherein the backup manager is configured to copy into the backup storage unit the first data and the second data stored in the file storage form, without being aware of whether the data was stored in the first storage unit or in the second storage unit.

14. The backup system of claim 13, wherein each time a converted data segment is stored in the second storage unit, the backup manager is configured to copy the converted data segment that is stored in the second storage unit to the backup storage unit.

15. The backup system according to claim 13, wherein the storage form converter is configured to allocate one file name for multiple blocks of the first data stored by the first storage unit, and, in correlation with the file name, to store in the second storage unit the first data and the locations of the multiple blocks stored in the first storage unit.

16. The backup system according to claim 13, wherein the storage form converter includes:

a storage location recorder configured to record the storage location of the first data in the block storage unit, when the first data is updated or added to, and a data converter configured to convert into the file storage form the first data located at the storage location that is recorded by the storage location recorder.

17. The backup system according to claim 16, wherein the storage form converter divides into multiple segments, first data that have been newly added to or updated to, for each time interval $t_2$.

18. The backup system according to claim 17, further comprising:

a plurality of the second storage units;

and wherein the storage form converter is configured to convert the first data into the file storage form, and to store the converted data in one of the second storage units that has free memory space.

19. A method for storing backup data, comprising:

storing first data using a first storage form;

storing second data using a second storage form;

converting into data for the second storage form, the first data stored in the first storage storing backup data for the first data and the second data;

for each time interval $t_2$, dividing into multiple data segments, first data that have been newly added to or updated to, and converting each data segment into the second storage form, and storing the converted data segments;

copying the first data and the second data without being aware of whether the data was stored in a first storage unit or in a second storage unit; and copying the stored converted data segments.

20. The method of claim 19, further comprising, converting data stored in the second storage form, into the first storage form.

* * * * *